United States Patent [19]

Wu

[11] Patent Number: 5,318,805
[45] Date of Patent: Jun. 7, 1994

[54] PROCESS FOR PROTECTING AND REPAIRING PLASTIC AND PLASTIC COMPOSITE MATERIALS

[75] Inventor: Yulin Wu, Bartlesville, Okla.

[73] Assignee: Phillips Petroleum Company, Bartlesville, Okla.

[21] Appl. No.: 988,662

[22] Filed: Dec. 10, 1992

[51] Int. Cl.$^5$ .............................................. B05D 7/22
[52] U.S. Cl. ................................. 427/386; 427/238; 427/301; 166/902
[58] Field of Search ............ 427/410, 386, 435, 388.1, 427/388.2, 239, 238, 301; 166/902

[56] References Cited

U.S. PATENT DOCUMENTS

| | | | |
|---|---|---|---|
| 3,307,996 | 3/1967 | Kneipp, Jr. | 427/238 |
| 4,526,813 | 7/1985 | Wu | 427/235 |
| 4,812,363 | 3/1989 | Bell et al. | 427/410 |
| 4,847,122 | 7/1989 | Goldberg et al. | 427/410 |
| 5,045,359 | 9/1991 | Wu | 427/388.2 |
| 5,069,966 | 12/1991 | Colaiacovo | 427/410 |
| 5,079,041 | 1/1992 | Wu | 427/239 |
| 5,104,691 | 4/1992 | Edwards et al. | 427/386 |
| 5,118,536 | 6/1992 | Wu et al. | 427/388.1 |
| 5,135,053 | 8/1992 | Lowther | 427/239 |
| 5,232,741 | 8/1993 | Wu | 427/239 |

FOREIGN PATENT DOCUMENTS

| | | | |
|---|---|---|---|
| 48104 | 4/1981 | Japan | 427/410 |
| 48505 | 5/1985 | Japan | 427/410 |
| 48901 | 1/1989 | Japan | 427/410 |

OTHER PUBLICATIONS

*International Encyclopedia of Composites*, vol. 2, "Environmental Resistance of High Performance Matrices and Composites", pp. 46–77 (1990).
*International Encyclopedia of Composites*, vol. 2, "Epoxy Resins", pp. 77–105 (1990).
*International Encyclopedia of Composites*, vol. 6, "Thermoplastic Matrix Composites", pp. 10–48 (1991).
*Encyclopedia of Polymer Science and Engineering*, vol. 17, "Transitions and Relaxations", pp. 1–47 (1989).
*International Encyclopedia of Composites*, vol. 1, "Aging of Polymer Matrix Fibrous Composites", pp. 15–26 (1990).
TUBOSCOPE Technical and Sales Information entitled "Tube-Kote Coatings", Aug., 1987.

*Primary Examiner*—Shrive Beck
*Assistant Examiner*—Diana Dudash
*Attorney, Agent, or Firm*—Gary L. Haag

[57] ABSTRACT

A process has been developed for treating plastic and plastic composite materials wherein a protective epoxy coating is placed on said material by contacting with a composition comprising an epoxy resin, an effective amount of curing agent for the epoxy resin, an alcohol and a hydrocarbon solvent. In another embodiment, the protective epoxy coating is applied by a process comprising the sequential contacting of the plastic or plastic composite surface with a first hydrocarbon solution comprised of an epoxy resin and a hydrocarbon solvent, and a second hydrocarbon solution comprised of an alcohol, a curing agent, and a hydrocarbon solvent.

33 Claims, No Drawings

PROCESS FOR PROTECTING AND REPAIRING PLASTIC AND PLASTIC COMPOSITE MATERIALS

This invention relates to a process for protecting, repairing and thereby extending the life of plastic and plastic composite materials.

Plastic and plastic composite materials are receiving widespread application as stress-bearing structural members because of weight, strength and cost advantages over metal counterparts which perform substantially the same function. These materials can also be used as coatings and liners thereby preventing the direct environmental exposure of an internal substrate which may be the major stress-bearing element (ex. coatings on metal pipe and tubing). However, plastic and plastic composite materials are also susceptible to degradation from environmental exposure to various gases, liquids, solids, radiation and heat. The resulting degradation can occur rapidly or over a long term (aging) and can result in an overall reduction in the mechanical strength of a given component. Furthermore, the various degradation processes can interact and thereby increase the susceptibility of the plastic or plastic composite material to the degrade.

As an example, the sorption of moisture by epoxies is often accompanied by a lowering of the glass transition temperature. This sorption then causes the epoxies to soften at lower temperatures and to also undergo a deterioration in mechanical response. The aging characteristics of epoxy composite matrixes in many service environments depend on the degree of deterioration of the high temperature mechanical properties caused by the sorption and accompanying plasticizing effect of sorbed moisture.

Sorbed moisture in epoxies can also cause epoxy matrixes to swell and the resulting stresses from swelling can significantly affect the durability of composite matrixes. Swelling stresses caused by moisture gradients, together with other stresses inherent in the material, such as fabrication stresses, can be of such magnitude as to cause localized fracturing of the polymer matrix. This localized fracturing can then increase the matrix permeability to other gases and when used as a lining or coating, reduce the effectiveness of the matrix medium to protect specific items such as metals from exposure to corrosive environments. Although the moisture induced swelling of epoxies generally results in only a one to two percent increase in thickness, dimensional changes of this magnitude in a composite material are sufficient to produce significant internal stresses as the fibers attempt to constrain the swelling. Absorbed moisture has also been shown to reduce the tensile strength and moduli of fresh epoxies and to enhance cavitation.

The plastic composition and the strength of plastics can also be detrimentally affected by environmental exposure through oxidation and hydrolysis at elevated temperatures. As an example, oxidation of epoxies occurs at 150° to 200° C. and hydrolysis at 225° to 300° C. The solid components about which the plastic medium is placed can also be degraded by environmental effects. For example, carbon and aromatic polyamide fiber can lose strength by oxidation. Furthermore, the hydrolysis of aromatic polyamide fiber is strongly catalyzed by acids and bases.

Degradation by the erosion of plastic surfaces can also result in a corresponding reduction in strength for plastics and plastic composites as the amount of stress-bearing material is reduced and highly active sites are provided for the various degradation processes.

SUMMARY OF THE INVENTION

It is an object of this invention to provide a process for placing a protective coating on the surfaces of plastic and plastic composite materials.

It is a further object of this invention to provide a process for placing a protective coating on the surfaces of tubes, pipes and vessels constructed of, lined or coated with plastic or plastic composite materials.

Yet a further object of this invention is to provide a process for repairing degraded plastic and plastic composite materials.

A still further object of this invention is to provide a process for repairing tubing, pipes, vessels and related flow equipment such as valves and pumps constructed of, lined or coated with plastic or plastic composite material which has degraded.

Yet a still further object of this invention is to provide a process for extending the life of plastic and plastic composite linings and coatings use on metal items such as tubing, piping and vessels.

A still yet further object of this invention is to provide a process for protecting and/or repairing items constructed of, lined or coated with plastic or plastic composite material in an in-situ manner at elevated temperatures and pressures.

It is yet a further object of this invention to provide a protection/repair process which is applicable for a wide range of plastics and plastic composite materials, and relatively simple and inexpensive to operate.

In accordance with this invention, a process has been developed for treating plastic and plastic composite materials wherein a protective epoxy coating is placed on said material by contacting with a composition comprising an epoxy resin, an effective amount of curing agent for the epoxy resin, an alcohol and a hydrocarbon solvent. In another embodiment, the protective epoxy coating is applied by a process comprising the sequential contacting of the plastic or plastic composite material with a first hydrocarbon solution comprised of an epoxy resin and a hydrocarbon solvent, and a second hydrocarbon solution comprised of an alcohol, a curing agent, and a hydrocarbon solvent.

DETAILED DESCRIPTION OF THE INVENTION

This invention concerns a process for treating plastic and plastic composite materials wherein a protective epoxy coating is placed on the material. The plastic or plastic composite material to be treated may be comprised entirely of plastic or plastic composite, may be one of many components in a system of which not all parts are plastic or plastic composite, or may be a portion of a given object such as a coating or liner. Examples of items which may be treated include tubing, piping, and related flow equipment such as valves, connectors, and pumps which are constructed of, lined or coated with a plastic or plastic composite. The protective epoxy coating (i.e., film) can function as either a protective layer for a new plastic or plastic composite or as a remedial layer to reduce and minimize the effects of degradation from past environmental exposure thereby extending the life of the component. As a remedial film, the pliable nature of the film enables the film to fill in gaps and voids created by the degradation process. Such properties are particularly desirable when repairing protective coatings such as phenolic or epoxy coatings on metal pipe or tubing wherein the coating functions to prevent direct exposure of the metal to corrosive environments. Coatings or films are generally distinguished from linings in terms of thickness. Linings are generally greater than 0.5 mm whereas coatings or films are less than 0.5 mm.

Plastics are polymeric materials which are commonly divided into two classes, thermoplastic and thermosetting. Both classifications possess useful corrosion resistant properties. Thermoplastics are materials which under suitable temperature conditions are permanently plastic, that is they can be softened by heat over and over again without any hardening taking place. Examples include, but are not limited to, polyethylene, polypropylene, polyvinylacetate, poly(vinyl chloride), polyamide, polystyrene, polycarbonate, polysulfone, polyphenylsulfide, and certain polyesters, polyurethanes and polyimides. On the other hand, thermosetting resins are converted by heat or by heat and pressure into permanently infusible materials. Examples include, but are not limited to, epoxy, phenolic, silicon, acrylate and certain polyesters, polyimides and polyurethanes. Broadly speaking, thermoplastics are characterized by long, chain-like molecules, whereas thermosetting resins comprise large, cross-linked, three-dimensional molecules.

Plastic composites or plastic matrix composites as used herein are used interchangeably and refer to a continuous plastic medium wherein the strength of the plastic is enhanced by the incorporation of a solid medium such as fiber, filament, woven or non-woven fabric, or flakes into the plastic medium. Examples include fiberglass- and carbon-fiber composites.

For the inventive process herein claimed, a preferred plastic and a preferred medium for the plastic composite are the thermoset plastics and the higher melting point thermoplastics. Thermoset plastics are more preferred and thermoset plastics selected from the group consisting of phenolic, epoxy, urethane, polyimide and mixtures thereof are still more preferred. The more preferred thermoset plastic and plastic medium for the practice of the herein claimed invention are selected from the group consisting of phenolic, epoxy and mixtures thereof. For the practice of this invention, the most preferred plastic and plastic mediums are those comprised of epoxy. The most preferred thermoplastic for the practice of this invention is polyamide and the most preferred polyamide is nylon.

The inventive process consists of contacting the plastic or plastic composite material one or more times with a composition comprising an epoxy resin, an effective amount of an amine curing agent for the epoxy resin, an alcohol, and a hydrocarbon solvent or diluent until a film is formed on the treated surface. In another embodiment, the film is formed by the sequential contacting of the surface with first a hydrocarbon solution of the epoxy resin followed by a hydrocarbon solution of the alcohol and curing agent.

When applying these mixtures to a system possessing appreciable vertical relief such as fiberglass or coated metal tubing and casing in a wellbore, the mixture can be introduced as slugs and immiscible or miscible fluids used as displacing agents. Fluid mixing can be minimized by displacing the slugs in a gravity stable manner.

Similarly, fluid slugs can be used in horizontal systems but slug volume must be sufficient to account for slug dilution at the front and back ends of the slugs from mixing with the upstream and downstream fluids. In pipelines, the single treatment mixture or the two treatment mixtures applied sequentially (i.e., epoxy in hydrocarbon and alcohol/curing agent in hydrocarbon) can be separated from the upstream and downstream fluids and each other by the use of mechanical pigs. In all situations, the solution must remain in contact with the surface for a time sufficient or effective to form a protective coating thereon.

Although the specific treatment techniques to follow refer specifically to wellbore treatment, the techniques are applicable to systems possessing appreciable vertical relief. As previously noted when treating plastic surfaces in down-well applications, the treatment composition can be applied as one solution, or alternatively it can be applied by contacting the surfaces sequentially with a solution of the curing agent and a solution of the epoxy resin. In practice, the resin solution and amine solution can be pumped from separate storage tanks to a static mixer at a T-juncture immediately prior to pumping the mixture downhole. The following downwell treatment methods can be used to apply the composition to the plastic and plastic composite surfaces of equipment used to recover natural fluids from a subterranean reservoir.

Batch Treatment. The treatment fluid comprising alcohol, epoxy resin, curing agent and hydrocarbon diluent is introduced preferably in an oil carrier into the annulus of a cased wellbore between the casing and the tubing. The well is returned to production and the injected compositions are gradually returned with the produced fluids, effecting en route the coating of contacted plastic surfaces with a protective film. Alternatively in this method, a liquid column of the treating agent can be placed in the tubing or the annular space and allowed to stand for a time which can range from 10 minutes to 24 hours before resuming production, usually at least 2 hours.

Extended Batch Treatment. The treatment fluid is injected into the annular space of a cased wellbore, the well is closed off, and the composition is continuously circulated with well fluids down the annulus and up the tubing for an extended period of time which can vary widely but will usually be between 6 and 48 hours. At the end of the determined time period, the well is returned to production.

Squeeze Treatment. The treatment fluid is injected down a cased wellbore penetrating a subterranean formation and is forced into the formation against formation pressure with high-pressure pumps. The composition can be injected within a gelled or dispersed polymer matrix based, for example, on polyacrylamides, biopolysaccarides, or cellulose ethers. After the pressure is released, the treating agent is slowly produced back with the recovered fluids, resulting in the application of a protective film on the plastic and plastic composite surfaces contacted by the treating agent as it flows to the surface. This method is particularly suitable in high-pressure gas or oil wells.

Spearhead Treatment. A highly concentrated slug of the treatment fluid, for example about 27 weight percent alcohol, about 27 weight percent amine, about 15 weight percent epoxy resin, about 31 weight percent hydrocarbon diluent, is injected into the tubing of a cased borehole and pressured down the tubing with a fluid column of a brine solution such as 2 weight percent aqueous potassium chloride. When the pressure is released, the aqueous brine column and the treatment fluid are produced up the tubing. The composition as a concentrated slug thus contacts the plastic and plastic composite walls of the tubing and lays down a protective film as it flows in a downward and upward circuit.

Plastic and plastic composite surfaces can also be protected by dipping or spraying the surfaces with the designated treatment fluid and then allowing excess fluid to drain from the treated surfaces at ambient conditions. A protective film is thus formed on the plastic or plastic composite surface without conventional heat-curing or extended air-drying treatment, although such drying treatments can be used if desired and if conditions permit it. The advantage in using a surface treatment system which does not require air- or heat-drying is that the system can be applied to plastic surfaces which are hundreds or thousands of feet below ground level or are in an environment which is always flooded with brine or other fluids.

When applying the composition to plastic or plastic composite surfaces, it is not necessary to pre-coat the surface to be treated with oil or other substances prior to applying the invention composition. The treated surfaces may or may not have an oil coating prior to the application.

The nature of the film thus formed can vary according to the particular composition used and the environment in which it is applied, but it has been found that the film will generally be a soft, sticky layer adhering to the plastic surface. It is not necessary that the composition harden to a tough coating, and it has been found in laboratory runs that the applied film tends to maintain a tacky or greasy consistency.

As previously noted, key components in the treatment mixture are epoxy, an epoxy curing agent, an alcohol, and a hydrocarbon. Any epoxy resin having, on the average, more than one vicinal epoxide group per molecule can be used in the inventive process. The epoxy resin may be saturated or unsaturated, aliphatic, cycloaliphatic, aromatic or heterocyclic, and may bear substituents which do not materially interfere with the curing reaction. These substituents may be monomeric or polymeric.

Suitable epoxy resins include glycidyl ethers prepared by the reaction of epichlorohydrin with a polyhydric alcohol under alkaline reaction conditions. The overall reaction and the resulting epoxy resin products obtained when epichlorohydrine is reacted with the polyhydric alcohol bisphenol A is set out below. The product is represented by structure (I) wherein n is zero or a number greater than 0, commonly in the range of 0 to 10, preferably in the range of 0 to 2.

Other suitable epoxy resins can be prepared by the reaction of epichlorohydrin with mononuclear di- and tri-hydroxy phenolic compounds such as resorcinol and phloroglucinol, selected polynuclear polyhydroxy phenolic compounds such as bis(p-hydroxyphenyl)methane and 4,4'-dihydroxy biphenyl, or aliphatic polyols such as 1,4-butanediol and glycerol.

Epoxy resins suitable for use in the invention have molecular weights generally within the range of 50 to about 10,000, preferably about 200 to about 1500. Presently preferred for the invention is the commercially available Epon 828 epoxy resin, a reaction product of epichlorohydrin and 2,2-bis(4-hydroxyphenyl)propane (bisphenol A) and having a molecular weight of about 400, an epoxide equivalent (ASTM D-1652) of about 185-192, and an n value in structure (I) above of about 0.2.

Additional epoxy-containing materials suitable for use in the present invention include the epoxidized derivatives of natural oils such as the triesters of glycerol with mixed long-chain saturated and unsaturated acids which contain, e.g., 16, 18 and 20 carbon atoms. Such natural oils are represented by formula (II):

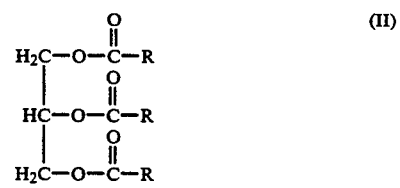

wherein R represents alkyl and/or alkenyl groups containing 15 to 19 carbon atoms with the proviso that epoxidation of said oils yields a polyepoxide having more than one vicinal epoxy group per molecule of epoxidized oil. Soybean oil is a typical triglyceride which can be converted to a polyepoxide suitable for use in the instant invention.

Other polyepoxides suitable for use in the present invention are derived from esters of polycarboxylic acids such as maleic acid, terephthalic acid, oxalic acid, succinic acid, azelaic acid, malonic acid, tartaric acid, adipic acid and the like with unsaturated alcohols as described by formula (III):

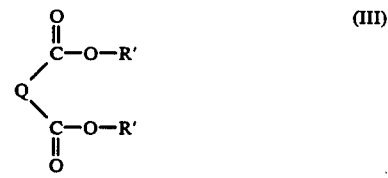

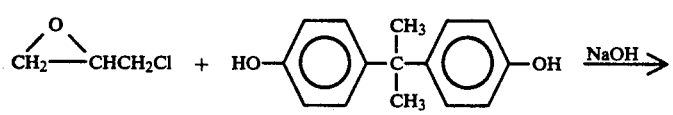

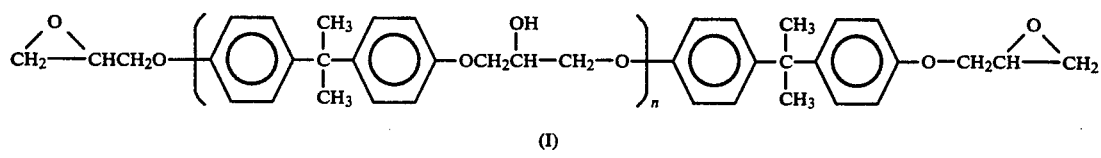

(I)

wherein Q represents a valence bond, or the following groupings: 1,2-phenylene, 1,4-phenylene, methylene, dimethylene, trimethylene, tetramethylene, pentamethylene, hexamethylene, heptamethylene, vinylene, 1,2-cyclohexylene, 1,4-cyclohexylene, 1,2-ethylenediol and the like, and R' represents alkylene and branched alkylene groups containing 4 to 14 carbon atoms. Representative epoxidized esters derived from materials described by structure (III) include the following: di(2,3-epoxybutyl)tetrahydrophthalate, di(2,3-epoxyoctyl)oxalate, di(2,3-epoxyisobutyl)adipate, di(3,4-epoxypentyl)succinate, di(4,5-epoxydodecyl)terephthalate, di(3,4-epoxyhexyl)phthalate, di(2,3-epoxybutyl)tartrate, di(7,8-epoxytetradecyl)adipate, di(3,4-epoxybutyl)glutarate, di(2,3-epoxyhexyl)pimelate, di(3,4-epoxyoctyl)suberate, di(4,5-epoxydecyl)azelate, de(2,3-epoxyisohexyl)tetrahydroterephthalate and the like.

In addition to the foregoing, it is contemplated that suitable polyepoxides can be derived from esters described by formula (IV) prepared from unsaturated alcohols and unsaturated carboxylic acids:

wherein R'' represents alkenyl and cycloalkenyl groups containing 4 to 12 carbon atoms and R''' represents alkenyl and cycloalkenyl groups containing 4 to 12 carbon atoms. Representative epoxidized esters include the following: 2,3-epoxypentyl-3,4-epoxybutyrate; 2,3-epoxybutyl-3,4-epoxyhexanoate; 3,4-epoxyoctyl-2,3-epoxycyclohexane carboxylate; 2,3-epoxydodecyl-4,5-epoxyoctanoate; 2,3-epoxyisobutyl-4,5-epoxydodecanoate; 2,3-epoxycyclododecyl-3,4-epoxypentanoate; 3,4-epoxyoctyl-2,3-epoxycyclodecane carboxylate and the like.

Other unsaturated materials which can be epoxidized to give resins suitable for use in the instant process include butadiene based polymers such as butadienestyrene copolymers, polyesters available by reacting derivatives of polyols such as ethylene glycol with unsaturated acid anhydrides such as maleic anhydride, and esters of unsaturated polycarboxylic acids. Representative polyepoxides derived from the latter include the following: dimethyl 3,4,7,8-diepoxydecanedioate; dibutyl 3,4,5,6-diepoxycyclohexane-1,2-carboxylate; dioctyl 3,4,7,8-diepoxyhexadecanedioate; diethyl 5,6,9,10-diepoxytetradecanedioate and the like.

Dimers of dienes such as 4-vinyl cyclohexene-1 from butadiene and dicyclopentadiene from cyclopentadiene can be converted to epoxidized derivatives which are suitable for use in the instant process.

Any agent suitable for curing epoxy resins may be used in the treatment composition for the inventive process. Curing agents for epoxy resins include amines, acids, anhydrides and aldehyde resins. The curing agent is used in an amount effective for curing the amount of epoxy resin used.

Curing agents suitable for use in the invention composition and process include compounds having amino hydrogen atoms. These include aliphatic, cycloaliphatic, aromatic and heterocyclic amines. Examples of curing compounds include aliphatic polyamines such as ethylene diamine, diethylene triamine, triethylene tetramine, tetraethylene pentamine, 1,4-aminobutane, 1,3-diaminobutane, hexamethylenediamine, 3-(n-isopropylamino)propylamine, N,N'-diethyl-1,3-propanediamine, hexapropyleneheptamine, penta(1-methyl-propylene)hexamine, tetrabutylenepentamine, hexa-(1,1-dimethylethylene)-heptamine, di(1-methylbutylene)triamine, pentaamylenehexamine, tri(1,2,2-trimethylethylene)tetramine, tetra(1,3-dimethylpropylene)pentamine penta(1,5-dimethylamylene)hexamine, 5-methylnonanediamine, penta(1,2-dimethyl-1-isopropylethylene)hexamine and N,N'-dibutyl-1,6-hexanediamine.

A class of polyamines particularly suitable for use in the invention are N-alkyl- and N-alkylenyl-substituted 1,3-diaminopropanes and mixtures thereof. Examples of such polyamines include N-hexadecyl-1,3-diaminopropane, N-tetradecyl-1,3-diaminopropane, N-octadecyl-1,3-diaminopropane, N-pentadecyl-1,3-diaminopropane, N-heptadecyl-1,3-diaminopropane, N-nonadecyl-1,3-diaminopropane, and N-octadecenyl-1,3-diaminopropane. Various commerically available mixtures of N-alkylated and N-alkenylated diamines can be used in the invention. The presently preferred polyamine is a commercial product sold under the trademark Duomeen T. This product is N-tallow-1,3-diaminopropane in which the majority of the tallow substituent groups are alkyl and alkenyl containing from 16 to 18 carbon atoms each, with a minority of substituent groups having 14 carbon atoms each. Although wishing not to be bound by theory, the effectiveness of compositions using Duomeen T stems is thought to result from its relatively high molecular weight, which produces a long-chain "net" to cover the plastic or plastic composite surface, its polyfunctionality, and its relatively high boiling point, which permits its use in high-temperature environments. Other commercially available materials include N-coco-1,3-diaminopropane which the majority of the coco substituent groups contain 12 to 14 carbon atoms, commerically available under the tradename Duomeen C, and N-soya-1,3-diaminopropane, which contains $C_{18}$ alkenyl groups along with a minor proportion of $C_{16}$ alkyl groups.

And surprisingly it has also been discovered that monoamines such as coco and tallow amines are also very effective in producing corrosion inhibiting compositions. Cocoamine as discussed above contain coco substituent groups which are alkyl and/or alkenyl groups, containing from 12 to 14 carbon atoms each and is commercially available under the tradename Armeen C ($C_{12}H_{25}NH_2$). Tallowamines also discussed above contain tallow substituent groups which are alkyl and/or alkenyl, containing from 16 to 18 carbon atoms each, with a minority of substituent groups containing 14 carbon atoms each. Other monoamines which may be used as curing agents include octylamine, dodecylamine, hexadecylamine, oleyamine, soyaamine, dicocoamine and dihydrogenated tallowamine.

Additional polyamines suitable for use in the invention can contain 3 or more nitrogen atoms as illustrated by the following examples: N-dodecyl-diethylenetriamine, N-tetradecyl-diethylene triamine, N-tetradecyl-dipropylenetriamine, N-tetradecyl triethylene tetramine and the corresponding N-alkenyl triamines.

Other curing agents which can be used include polyfunctional nitrogen-containing compounds such as, for example, amino acids, amino alcohols, amino nitriles, and amino ketones; sulfonic acids; carboxylic acids; and organic anhydrides.

Alcohols suitable for use in the invention include any alkanols containing at least one —OH functional group. These include alcohols containing 1 to about 15 carbon atoms such as methanol, ethanol, 1-propanol, 2-propanol, butanols, pentanols, hexanols, heptanols, octanols, 1-pentadecanol, and mixtures of these. The most suitable alcohols include alcohols selected from the group consisting of methanol, ethanol, 1-propanol, 2-propanol, n-butanol, n-pentanol, n-hexanol, n-heptanol and combinations of any two or more thereof. Polyols containing 1 to 5 carbon atoms such as ethylene glycol, 1,3-propanediol, 2,3-butanediol, glycerol and pentaerythritol can also be used. Presently, methanol is preferred, particularly in a treatment composition containing xylene as the aromatic hydrocarbon diluent, Epon 828 as the epoxy resin, and Duomeen T as the polyamine, because Duomeen T is soluble in methanol at room temperature and because of the effectiveness of the resulting treatment process.

A hydrocarbon diluent is used for the invention composition. Examples of hydrocarbon diluents suitable for use in the treating agents include the isomeric xylenes, toluene, benzene, naphtha, cyclohexylbenzene, fuel oil, diesel oil, heavy aromatic oils, Stoddart solvent, crude oil, and condensate from gas wells. Presently, xylene is the preferred hydrocarbon diluent because it is an effective solvent for the other preferred components and because of the corrosion-inhibiting effectiveness of the resulting composition.

The higher-boiling aromatic hydrocarbons are particularly useful as diluents when operating in deeper wells with higher downhole temperatures and in high-temperature gas and oil wells generally. With regard to process operation, temperature and pressure are not key parameters and operation at temperatures of 300° F. and higher and/or pressures of 6000 psia and higher is possible.

In some treatment methods in closed systems, it is advantageous to employ a carrier liquid or drive fluid to force a slug of the corrosion-inhibiting composition into the well vessel or pipe being treated. Any of the hydrocarbons listed above as suitable diluents may be used. For practical and economic reasons, diesel oil, sea water or condensate from the well being treated are preferred carrier fluids.

Various alcohol-aromatic hydrocarbon azeotropes can be used in the invention compositions to supply at least partially the diluent and the alcohol components. Representative azeotropes include the following, with the weight percent of each component in parenthesis: methanol (39)/benzene (61); ethanol (32)/benzene (68); 2-propanol (33)/benzene (67); 1-propanol (17)/benzene (83); isobutyl alcohol (9)/benzene (91); 1-butanol (68)/p-xylene (32); 2-pentanol (28)/toluene (72) and hexanol (13)/p-xylene (87). It is also contemplated that impure alcohol streams such as mixed butanols resulting from Oxo technology using propylene feedstock can be used in the treating compositions.

The components of the inventive process can be mixed in any order, but it is presently preferred to dissolve the epoxy resin in a hydrocarbon and add an amine/alcohol/hydrocarbon mixture to this solution. A batch of the treating composition can be prepared by mixing a first solution of alcohol, hydrocarbon and amine in, for example, approximately a 1:1:1 (mL:mL:g) ratio and a second solution of an epoxy resin in a hydrocarbon in about a 3:1 (g:mL) ratio. The treatment fluid is then prepared by mixing the first and second solutions in such proportions that the weight ratio of polyamine to epoxy resin in the final solution varies over the broad range of about 1000:1 to 1:500, preferably about 100:1 to 1:50, and most preferably about 10:1 to 1:5. The weight percent of alcohol in the final composition varies over the broad range of 1 to 99%, preferably 10 to 60%, and most preferably 20 to 30%. The hydrocarbon diluent can be present in any concentration range in which the invention composition remains in an essentially fluid pumpable state.

An excess of the amine with respect to the epoxy is preferred. A particularly suitable composition contains an equivalent ratio of polyamine to epoxy of greater than about 1:1, preferably about 1.25:1 to 10:1, most preferably about 1.5:1 to 5:1. The protective film obtained with such an amine-rich system generally has, in contrast to the hard coatings obtained with conventional cured epoxy systems, a tacky, comparatively soft consistency.

The polyamine:epoxy molar ratio corresponding to the preferred equivalent ratios above depends, of course, on the relative number of functional groups of the specific compounds used, and these ratios can be computed by methods known in the art. For example, for a polyamine containing 3 active hydrogen atoms and an epoxy resin having an average of 2 epoxide groups per molecule, the stoichiometric molar ratio of polyamine:epoxy resin is 0.67:1. The preferred compositions containing such polyamines and epoxy resins have a molar ratio of at least about 0.8:1, preferably within the range of about 1.1:1 to 10:1, most preferably about 1.25:1 to 6:1. The corresponding volume amounts for the preferred components, based upon a density of about 0.821 g/mL and molecular weight of 350 for the polyamine and about 1.164 g/mL and 400 for the epoxy resin, are generally at least about 1.0:1, preferably about 1.3:1 to 12:1, most preferably about 1.5:1 to 7:1.

EXAMPLE I

The feasibility of repairing plastic coated metal objects damaged by environmental exposure was examined in the following set of tests.

A simultaneous series of tests were carried out in 1-liter Erlenmeyer flasks equipped with magnetic stirring bars under laboratory conditions designed to simulate the corrosive oil-water environment frequently encountered in field operation. The rate of corrosion and the relative effectiveness of the treatment process was determined using a Corrater ® monitoring system (Rohrback Instruments). Each test consisted of fastening two one-inch long carbon-steel electrodes, which had previously been coated with a designated coating of stated thickness (see Table I), to a probe and suspending the probe in a stirred oil-water mixture which was maintained at 49° C. and through which was bubbled a slow stream of carbon dioxide so as to maintain the mixture at near $CO_2$ saturation conditions. Test pressures were near ambient. The solution consisted of 950 mL of synthetic brine (87.05 g $CaCl_2.2H_2O$, 39.16 g $MgCl_2.6H_2O$ and 2,025. g NaCl per 5 gal. distilled $H_2O$) and 50 ml kerosene.

The inhibitor was prepared by combining 1 part epoxy resin/hydrocarbon solution (A) with 2 to 4 parts amine/alcohol/hydrocarbon solution (B) wherein the epoxy resin was Epon 828 ®; the hydrocarbon solution was xylene; the amine was Duomeen T ®; and the alcohol was methanol. The ratio of A:B for the first treatment in Table I was 1:2 whereas the ratio for those probes receiving a second treatment was 1:4. The coated electrodes which had been damaged by environmental exposure were treated by dipping the electrode into the inhibitor for 1 second and then drying at room temperature for about 1 hr.

The test results are tabulated in Table I and show that the corrosion inhibitor repaired and thereby prolonged the useful life of all coatings. The first column in Table I shows the commercially available coatings which were placed on the carbon-steel electrode. The second column shows the general component make-up. The thickness of the coating is shown in column 3. Column 4 shows the corrosion rate of all coatings after 60 hrs. exposure to the environmental conditions previously discussed. All probes were then treated with inhibitor. After the treatments, the corrosion rates decreased to zero and remained at zero for 72 hours (column 5). Seventy-two hours following inhibitor treatment, the fluid in the flasks were changed and the corrosion rates for probes coated with TK-2, TK-7 and TK-99 were observed to increase. Corrosion rates 24 hrs. after fluid change-out are presented in column 6. The corrosion rates remained below the rates observed prior to application of the inhibitor. Notably, the corrosion rates for TK-69 and TK-70 remained zero. Twenty-four hours following the fluid change-out, the probes coated with TK-2, TK7, and TK-99 were again treated and the rates dropped to zero and stayed at or near zero for 24 hrs. (column 7). The fluids were then changed out in the vessels containing the TK-2, TK-7 and TK-99 coated electrodes. Twenty-four hours following this change-out, the corrosion rate remained significantly less than that observed prior to the first treatment (column 8). Meanwhile, the corrosion rates for TK-69 and TK-70 which contain epoxy remained at zero even in the absence of a second application of inhibitor.

The preceding data conclusively establish that corrosion rates can be significantly reduced and the life of metal objects coated with epoxy, phenolic and polyamide-bearing coatings extended via a process wherein the coated object is contacted with the above inhibitor or a variant thereof. Best results were obtained when the coating contained some epoxy.

(b) an amine curing agent for the epoxy resin selected from the group consisting of N-coco-1,3-diaminopropane, N-soya-1,3-diaminopropane, tallowamine, cocoamine, soyamine, dicocoamine, oleyamine, and dehydrogenated tallowamine, the curing agent and epoxy being present in an equivalent ratio of from about 1.5:1 to about 5:1;

(c) a hydrocarbon diluent present in an amount to maintain the composition in a fluid state; and (d) an alcohol selected from the group consisting of methanol, ethanol, 1-propanol, 2-propanol, n-butanol, n-pentanol, n-hexanol, n-heptanol, and combinations of any two or more thereof, present in an amount of about 10 to about 60 weight percent, based on the weight of the composition, wherein said composition is contacted with said surface for a time sufficient to form a protective coating.

2. A process according to claim 1 wherein the epoxy resin is a reaction product of epichlorohydrin and a polyhydric alcohol.

3. A process according to claim 2 wherein the polyhydric alcohol is bisphenol A and the epoxy resin has an epoxide equivalent within the range of 185 to 192.

4. A process according to claim 1 wherein the hydrocarbon diluent is selected from the group consisting of isomeric xylenes, toluene, benzene, naphtha, cyclohexylbenzene, fuel oil, diesel oil, heavy aromatic oils, Stoddart solvent, crude oil, and condensate from gas wells.

5. A process according to claim 1 wherein the diluent is xylene.

6. A process according to claim 1 wherein said surface is contacted with said composition at a temperature of at least about 300° F. and a pressure of at least about 6000 psia.

7. A process according to claim 1 wherein said surface is contacted sequentially by a first solution comprising the curing agent and the alcohol selected from the group consisting of methanol, ethanol, 1-propanol, 2-propanol, n-butanol, n-pentanol, n-hexanol, n-heptanol, and combinations of any two or more thereof, and then a second solution comprising the epoxy resin and the hydrocarbon diluent.

TABLE I

| | | | Repair of Environmentally Damaged Coated Materials | | | | |
|---|---|---|---|---|---|---|---|
| Coating[a] | Component | Thickness mil[g] | Corrosion Rate After 60 Hrs. (mpy)[g] | Corrosion Rate[b] 72 Hrs. After Treatment (mpy) | Corrosion Rate[c] 24 Hrs. After Change Out (mpy) | Corrosion[d] Rate (mpy) | Corrosion[e] Rate (mpy) |
| TK-2 | Phenolic | 1.7 | 5.0 | 0 | 2.4 | 0 | 1.6 |
| TK-7 | Modified Phenolic | 0.8 | 79 | 0 | 9.7 | 0.1 | 25.3 |
| TK-69 | Epoxy-Modified Phenolic | 3.7 | 2.4 | 0 | 0 | 0 | 0[f] |
| TK-70 | Epoxy | 4.1 | 2.5 | 0 | 0 | 0 | 0[f] |
| TK-99 | Polyamide (Nylon) | 0.7 | 1.5 | 0 | 0.5 | 0 | 0.1 |
| Baseline | No Coating | — | 150 | 150 | 150 | 150 | 150 |

[a]Commercially available coatings sold by TUBOSCOPE, P.O. Box 808, Houston, TX 77001
[b]The coated electrodes were treated with inhibitor, dried for 1 hour and transferred into the test vessel. The corrosion rate 72 hrs. after treatment is presented in this column. The test fluid was then changed out.
[c]Corrosion rate 24 hrs. after fluid changeout. TK-2, TK-7 and TK-99 coatings were again treated with inhibitor. TK-69 and TK-70 were not treated with inhibitor.
[d]Corrosion rate 96 hrs. after first treatment or 24 hrs. after second treatment of TK-2, TK-7 and TK-99 coated electrodes. Fluid changed out in vessels containing TK-2, TK-7 and TK-99 coated electrodes.
[e]Corrosion rates were obtained at 144 hrs. after the original treatment. This corresponds to 48 hrs. after the second treatment of electrodes coated with TK-2, TK-7, and TK-99 or 24 hrs. following fluid change-out for the vessels containing these electrodes.
[f]These electrodes were not retreated with inhibitor after the original test fluid was changed out. The results are corrosion rates 144 hrs. after the original inhibitor treatment step.
[g]mil = 0.001 in., mpy = mils per year That which is claimed is:

1. A process for treating plastic and plastic composite material including metal components that are coated or lined with plastic or plastic composite material comprising contacting at least a portion of a surface of said material with a composition comprising:

(a) an epoxy resin;

8. A process according to claim 1 wherein the alcohol is present in an amount of about 20 to about 30 weight percent, based on the weight of the composition.

9. A process according to claim 8 wherein the epoxy resin is a reaction product of epichlorohydrin and a polyhydric alcohol.

10. A process according to claim 9 wherein the polyhydric alcohol is bisphenol A and the epoxy resin has an epoxide equivalent within the range of 185 to 192.

11. A process according to claim 8 wherein the hydrocarbon diluent is selected from the group consisting of benzene, toluene, xylene and naphtha.

12. A process according to claim 8 wherein the hydrocarbon diluent is xylene.

13. A process according to claim 1 wherein said material is selected from the group consisting of thermo-set plastics and plastic composites.

14. A process according to claim 1 wherein said material is a plastic composite.

15. A process according to claim 14 wherein said plastic composite is comprised of epoxy.

16. A process for treating plastic and plastic composite material including metal components that are coated or lined with plastic or plastic composite material which are used in a well for the recovery of natural fluids from a subterranean reservoir, the method comprising injecting into a wellhead a composition comprising:
(a) an epoxy resin;
(b) an amine curing agent for the epoxy resin selected from the group consisting of N-coco-1,3-diaminopropane, N-soya-1,3-diaminopropane, tallowamine, cocoamine, soyamine, dicocoamine, oleyamine and dehydrogenated tallowamine, the curing agent and epoxy being present in an equivalent ratio of from about 1.5:1 to about 5:1;
(c) a hydrocarbon diluent present in an amount to maintain the composition in a fluid state; and
(d) an alcohol selected from the group consisting of methanol, ethanol, 1-propanol, 2-propanol, n-butanol, n-pentanol, n-hexanol, n-heptanol, and combinations of any two or more thereof, present in an amount of about 10 to about 60 weight percent, based on the weight of the composition, into the well; and
contacting at least a portion of a surface of said plastic or plastic composite material with said composition for a time sufficient to form a protective film thereon.

17. A process to claim 16 comprising the steps of:
(a) stopping production of the natural fluids;
(b) injecting the composition into the well; and
(c) returning the well to production, thereby causing the composition to flow to the wellhead with the natural fluids and to be deposited as a protective film en route on the surfaces of said plastic and plastic composite material with which it contacts.

18. A process according to claim 16 wherein the well contains casing and tubing comprising the sequential steps of:
(a) stopping production of the natural fluids;
(b) injecting the composition between the tubing and casing;
(c) circulating the composition through the tubing and between the tubing and casing for a time sufficient to form a protective film thereon; and
(d) returning the well to production.

19. A process according to claim 17 wherein a drive fluid is used to facilitate the injecting of the composition into the well.

20. A process according to claim 16 wherein the hydrocarbon diluent is selected from the group consisting of isomeric xylenes, toluene, benzene, naphtha, cyclohexylbenzene, fuel oil, diesel oil, heavy aromatic oils, Stoddart solvent, crude oil, and condensate from gas wells.

21. A process according to claim 20 wherein the hydrocarbon diluent is selected from the group consisting of benzene, toluene, xylene and naphtha.

22. A process according to claim 21 wherein the hydrocarbon diluent is xylene.

23. A process according to claim 16 wherein the alcohol present in an amount of about 20 to 30 weight percent, based on the weight of the composition.

24. A process according to claim 16 wherein the amine:epoxy equivalent ratio in the composition is about 1.5:1.

25. A process according to claim 16 wherein said material is a thermo-set plastic or plastic composite.

26. A process according to claim 16 wherein said material is a plastic composite.

27. A process according to claim 26 wherein said plastic composite is a thermo-set plastic composite.

28. A process according to claim 27 wherein said thermo-set plastic is epoxy.

29. A process according to claim 16 wherein said material is a plastic selected from the group consisting of phenolic, epoxy, urethane, polyamide and mixtures thereof.

30. A process according to claim 29 wherein said material functions as a coating or liner thereby protecting a metal substrate from direct environmental exposure.

31. A process according to claim 16 wherein said material is comprised of epoxy.

32. A process according to claim 31 wherein said material functions as a coating or liner thereby protecting a metal substrate from direct environmental exposure.

33. A process according to claim 16 in which at least a portion of the well is at a temperature of at least about 300° F. and a pressure of at least about 6000 psia.

* * * * *

UNITED STATES PATENT AND TRADEMARK OFFICE
CERTIFICATE OF CORRECTION

PATENT NO. : 5,318,805
DATED : June 7, 1994
INVENTOR(S) : Yulin Wu

It is certified that error appears in the above-identified patent and that said Letters Patent is hereby corrected as shown below:

Claim 23, column 14, line 26, after "alcohol" and before "present" insert --- is ---.

Signed and Sealed this

Sixth Day of September, 1994

Attest:

BRUCE LEHMAN

*Attesting Officer*  *Commissioner of Patents and Trademarks*